United States Patent [19]
Needham

[11] Patent Number: 6,133,943
[45] Date of Patent: *Oct. 17, 2000

[54] METHOD AND APPARATUS FOR PRODUCING A COMPOSITE IMAGE

[75] Inventor: Bradford H. Needham, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/728,130

[22] Filed: Sep. 30, 1996

[51] Int. Cl.[7] .................................................. H04N 7/00
[52] U.S. Cl. .................................................. 348/37; 348/39
[58] Field of Search ........................... 348/36–39, 118, 348/135, 117, 144, 145, 146, 147; 354/94; H04N 7/00

[56] References Cited

U.S. PATENT DOCUMENTS

| | | | |
|---|---|---|---|
| 4,630,111 | 12/1986 | Blain et al. | 348/147 |
| 4,943,821 | 7/1990 | Gelphman et al. | 354/99 |
| 4,983,842 | 1/1991 | Takamine | 250/358.1 |
| 5,045,872 | 9/1991 | Yoshimura et al. | 354/94 |
| 5,187,571 | 2/1993 | Braum et al. | 358/85 |
| 5,253,107 | 10/1993 | Smith | 359/469 |
| 5,262,867 | 11/1993 | Kojima | 358/209 |
| 5,274,427 | 12/1993 | Miyasaka et al. | 355/310 |
| 5,278,657 | 1/1994 | Tamura | 358/209 |
| 5,280,363 | 1/1994 | Nakamura et al. | 358/335 |
| 5,315,331 | 5/1994 | Ohshita | 354/94 |
| 5,317,394 | 5/1994 | Hale et al. | 348/208 |
| 5,379,063 | 1/1995 | Kishi et al. | 348/208 |
| 5,436,672 | 7/1995 | Medioni et al. | |
| 5,444,478 | 8/1995 | Lelong et al. | 348/39 |
| 5,459,529 | 10/1995 | Searby et al. | |
| 5,467,163 | 11/1995 | Uchiyama | 354/402 |
| 5,475,428 | 12/1995 | Hintz et al. | 348/263 |
| 5,479,537 | 12/1995 | Hamashima et al. | 382/266 |
| 5,481,330 | 1/1996 | Yamasaki | 354/412 |
| 5,510,830 | 4/1996 | Ohia et al. | 348/36 |
| 5,528,290 | 6/1996 | Saund | 348/218 |
| 5,649,032 | 7/1997 | Burt et al. | 382/284 |
| 5,650,813 | 7/1997 | Gilblom et al. | 348/36 |
| 5,666,459 | 9/1997 | Ohta et al. | 348/39 |
| 5,670,935 | 9/1997 | Schofield et al. | 348/461 |

FOREIGN PATENT DOCUMENTS

| | | |
|---|---|---|
| 0534438A3 | 9/1992 | Germany . |
| 539897A2 | 10/1992 | Germany . |
| 2316258 | 2/1998 | United Kingdom . |
| WO 94/10653 | 5/1994 | WIPO . |

OTHER PUBLICATIONS

Tom. R. Halfhill; "See You Around"; BYTE Magazine; pp. 85–90, May 1995.

Primary Examiner—Howard Britton
Assistant Examiner—Nhon T. Diep
Attorney, Agent, or Firm—Blakely, Sokoloff, Taylor & Zafman LLP

[57] ABSTRACT

A composite image may be produced from a plurality of images. Briefly, in accordance with one embodiment of the present invention, a process for producing a composite image includes the following steps. A current image is selected from the plurality of images. The current image has an offset. A portion is extracted from the current image. The portion of the current image is then transferred onto a storage medium that stores the composite image, to a position corresponding to the offset.

29 Claims, 6 Drawing Sheets

METHOD AND APPARATUS FOR PRODUCING A COMPOSITE IMAGE

BACKGROUND OF THE INVENTION

(1) Field of the Invention

The present invention generally relates to images. More specifically, the present invention relates to producing composite images.

(2) Description of the Related Art

The word "panorama" originates from the Greek words "pan" meaning "all" and "horama" meaning "view" or "sight". The modern day version has several meanings: 1) an unobstructed and wide view of an extensive area; 2) an extended pictorial representation; 3) a continuously passing or changing scene or unfolding of events; and 4) a comprehensive surveillance of a subject.

Composite pictures that represent unobstructed and wide views of an extensive area are typically produced by using a camera such as, by way of example, a 35 mm camera with a 15 mm lens. The camera is mounted on a tripod and a series of photographs are shot while turning the camera 360° about a fixed point (center of tripod). The camera is rotated, after each exposure, at discrete angles such as, by way of example, 20 or 30 degrees.

Subsequently, the photographs may be digitized and stored onto a storage device, such as a compact disk. Then, conventional image "stitching" systems, such as, by way of non-limiting example, Quick Time VR Authoring Tools Suite, available from Apple Computer Corp., of Cupertino, Calif., map the overlapping features of successive images and stitch these images together. Stitching is a process where two or more discrete images, that are part of a larger scene, are combined, such that the combination of several discrete images represents one part of the larger image.

To stitch single images together, without distortion, it is desirable to rotate the camera about a focal point of the lens. In other words, the focal point of the lens should coincide with the center of rotation of the camera. It is also desirable to determine a field of view by measuring the focal length of the lens. Since the focal length may change with every set of pictures taken, such as in a camera equipped with a zoom mechanism, a photographer should memorize or record the focal length for each set of pictures taken and adjust the camera mount accordingly. If the camera is not rotated about the focal point of the lens used for a particular set of images, distortion may occur. Additionally, the system that stitches the resulting images together should be provided, before stitching, with the angle at which each image was generated to calculate an absolute offset between different images to be stitched. Identifying the focal length and angle, for each set of pictures taken, and adjusting the camera mount to coincide with the focal point imposes considerable overhead.

FIG. 1 diagrammatically illustrates a cross-sectional view of a camera 100, which is mounted on a tripod (not shown) having a center of rotation (CR) 114. Camera 100 includes a lens 102 having a focal point (FP) 116 and a focal length 103. Typically, an incident image of a scene to be recorded is projected onto lens 102, while camera 100 is rotated 360° about its center of rotation 114. The image is focalized at focal point 116 and projected onto a photosensitive recording medium such as film 104.

Later, during the processing of a set of images obtained from film 104, conventional systems typically assume that the distance between focal point 116 and the tripod's center of rotation 114 is 0. In reality, the location of focal point 116 may not coincide with the tripod's center of rotation 114. Current processes of stitching multiple images into a composite image do not geometrically correct the distortions caused by the mismatch between the focal point 116 and the tripod center of rotation 114. While some processes automatically or manually "warp" the images' edges, these processes are costly and time-consuming or may require the expertise of a professional photographer.

Other techniques of producing a composite image record an extremely wide-angle image by using a fish eye lens, such as a lens with a 230° field of view. The problem with these techniques is that the type of lenses used by these techniques are expensive and therefore not accessible to amateur photographers.

It is desirable to provide a technique for creating composite pictures with images that blend smoothly with one another and with reduced distortion. It is further desirable to provide a technique for producing composite pictures without expensive equipment or the expertise of a professional photographer.

BRIEF SUMMARY OF THE INVENTION

A composite image may be produced from a plurality of images. Briefly, in accordance with one embodiment of the present invention, a process for producing a composite image includes the following steps. A current image is selected from the plurality of images. The current image has an offset. A portion is extracted from the current image. The portion of the current image is then transferred onto a storage medium that stores the composite image, to a position corresponding to the offset.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
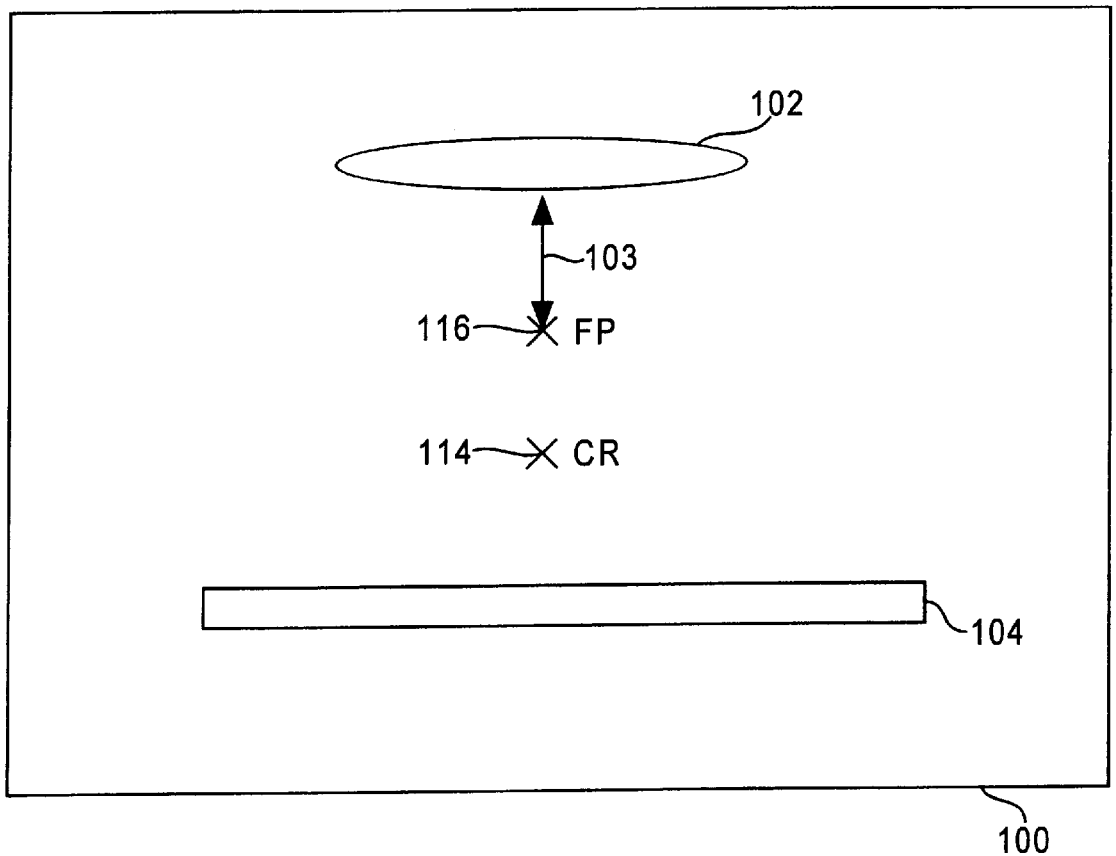
FIG. 1 diagrammatically illustrates a cross-section of a still camera.
Figure 2:
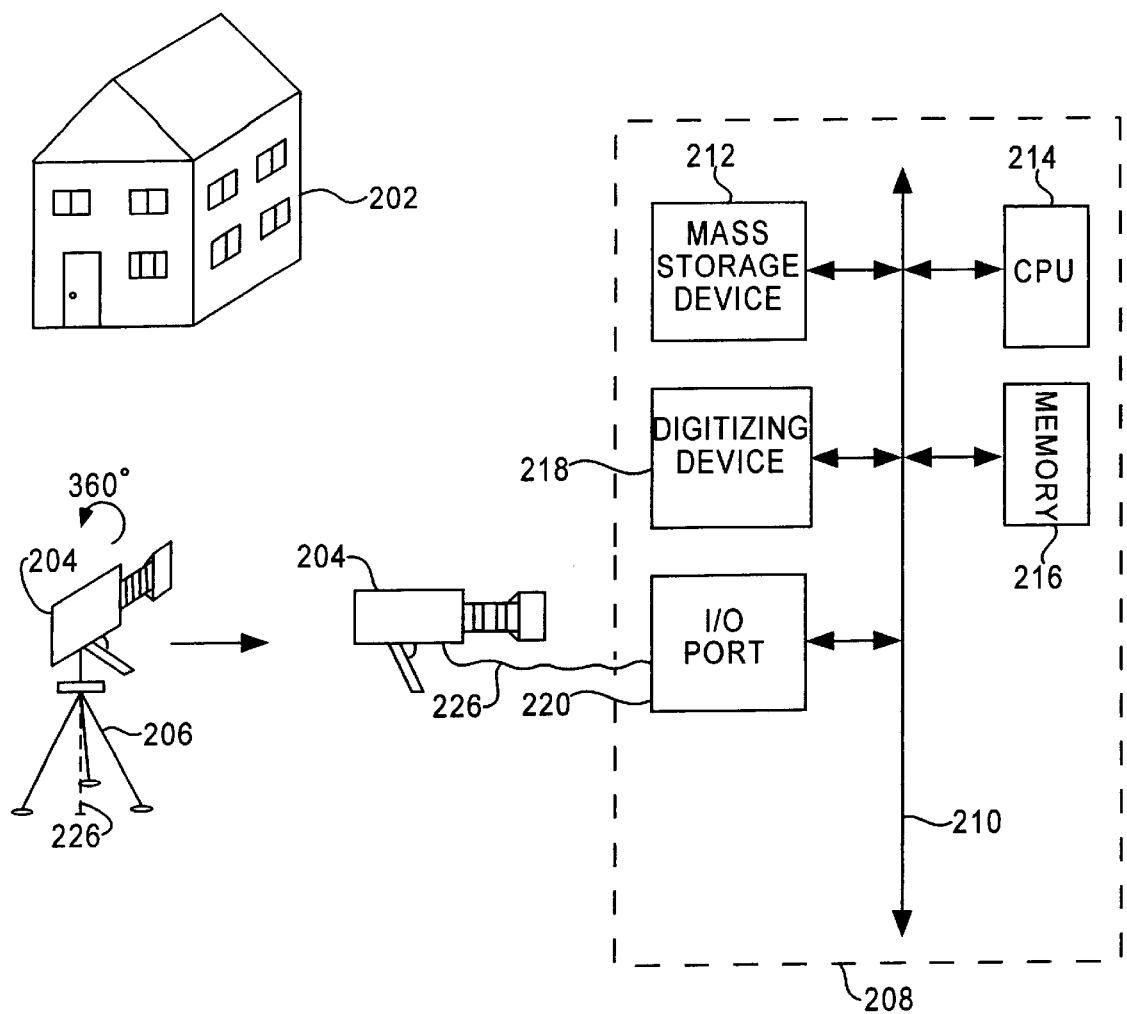
FIG. 2 diagrammatically illustrates one embodiment of a system that employs a process for producing a composite image according to the present invention.

FIG. 2 illustrates in diagrammatic form one embodiment of a system that employs a process for producing a composite image according to the present invention. A large set of images (video frames, in this particular embodiment), that collectively represent a scene including subject 202, may be generated by rotating an image recording apparatus 204 a little over 360° about a substantially fixed point. The image recording apparatus may include an image detection device (not shown), such as a charge coupled device (CCD). The image recording apparatus may also include an image recording medium onto which images of a scene may be recorded. In one embodiment, according to the present invention, the image recording apparatus 204 includes a standard, off-the-shelf, video camera, while the image recording medium may include a video tape, although the invention is not limited in scope in this respect. The video camera can produce a large number of images in a very short time, thereby overcoming a disadvantage associated with still cameras that require an extensive time to produce a large number of images.

Video camera 204 may, for example, be rotatably mounted on a tripod 206. The fixed point (center of rotation), about which camera 204 is rotated, may include the center of a tripod onto which the video camera 204 is rotatably mounted.

Once the scene including subject 202 is recorded onto the video tape, the tape is rewound. Video camera 204 with the rewound tape may then be coupled to an input/output port 220 of computer system 208 via a cable 226, although the invention is not limited in this respect. Computer system 208 then processes the videotaped images as the tape is played back.

By way of non-limiting example, video camera 204 may also be a digital video camera such as a Connectix Quick-Cam™ video camera made by Connectix Corporation of San Mateo, Calif. Such a video camera can be coupled to the computer system 208 via the computer system's parallel port. In this case, while the camera is rotated and shooting the scene, computer system 208 processes images as a video camera signal is driven to the digitizing device 218, thereby eliminating the need for a video tape. The computer system described in the foregoing can also be embedded in video camera 204.

Computer system 208 may include a CPU 214 coupled via bus 210 to a mass storage device 212, to a Random Access Memory 216 (RAM), and to a digitizing device 218. In one embodiment according to the present invention, the digitizing device 218 is an Intel Smart Video Recorder Pro digitizing device, made by Intel Corporation of Santa Clara, Calif. A video capture program may be executing on the computer system while the tape is played back, thereby digitizing the tape's images. The tape's images that have been digitized may then be stored in a file. The video capture program can be, for example, an Asymetrix Digital Video Capture Program, produced by Asymetrix Corporation of Bellevue, Wash. In this embodiment, each image recorded in digital form is distinguishable from other images and has an "address" within a storage medium onto which the file resides. The address can be used to access a particular image from the set of digitized images.

Figure 3:
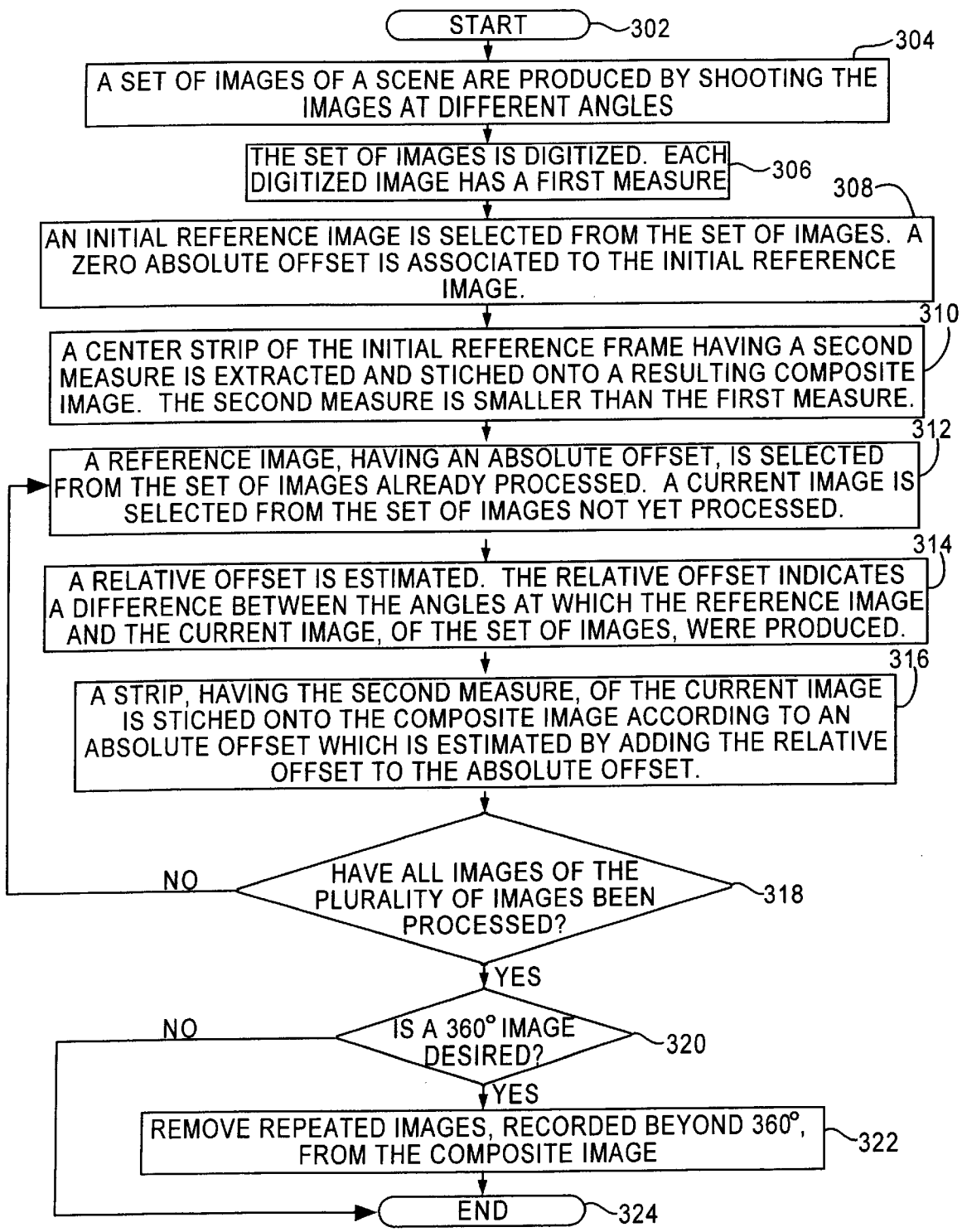
FIG. 3 is a flowchart diagram for an embodiment of a process for producing a composite image according to the present invention.

FIG. 3 is a flowchart diagram for one embodiment of a process for producing a composite image according to the present invention. The process for this embodiment starts at block 302 from where it passes to block 304. At block 304, a set of images of a scene are produced by filming the scene at different angles of rotation. A video camera, such as the one explained in conjunction with FIG. 2, may produce these images while being rotated in a horizontal plane of rotation about an axis of rotation perpendicular to the plane of rotation. However, the scope of the invention is not limited to horizontal rotation. The video camera can also be rotated in a vertical plane of rotation about an axis of rotation perpendicular to the vertical plane. In general, the video camera may be rotated in any plane about an axis of rotation perpendicular to that plane.

While the video camera is rotated 360° about the center of rotation, approximately 600–700 images (frames) may be recorded onto a recording medium such as a video tape (not shown). Factors that affect the number of images produced include a focal length of a lens of the video camera and the speed at which the video camera is rotated relative to an image production rate of the video camera. The larger the focal length, the narrower the field of view is and, consequently, the number of images required to produce a composite image is larger. The higher the speed of rotation is, the lower the number of images produced. The 360° rotation of the video camera can be performed either automatically, by having a motor (not shown), for example, rotate the video camera at a predetermined speed, or by having an operator (photographer) manually rotate the camera about the center of rotation.

The process then passes to step 306 where the set of images is digitized by running a video capture program, such as Asymetrix Digital Video Capture Program, while playing back the tape. Each digitized image has a first measure. In one embodiment of a process according to the present invention the first "measure" is defined as the size of an image in a first dimension. For example, in the case where the video camera is rotated in a horizontal plane, the "first dimension" is along an axis parallel to the horizontal plane. Thus, if the image produced is a rectangle with a base (width) parallel to the plane of rotation, the first measure of the image is the size of the base (width).

At step 308, an initial reference image is selected from the set of digitized images. In one embodiment, the initial reference image is the first image of the set of recorded images. A predetermined absolute offset is associated to the initial reference image. The absolute offset of the initial reference image indicates a position of the initial reference image relative to the position at which the composite image starts. In one embodiment according to the present invention, the absolute offset of the initial reference image is 0.

The process then passes to step 310 where a portion (center strip, in this embodiment) of the initial reference image is extracted and recorded onto a storage medium at a position corresponding to the absolute offset of the initial reference image. The storage medium stores in digital form the composite image. The center strip has a measure (second measure) smaller than the measure (first measure) of the image from which the center strip was extracted. Hereinafter, the term "measure" will be referred to as width. In one embodiment of the process according to the present invention the center strip has a width (second width) of 16 pixels while the width of an image (first width) is 320 pixels.

The process then passes to step 312 where a reference image, having an absolute offset (hereinafter "reference offset"), with respect to the initial reference image, is selected from a set of images that have already been processed by the process according to the present invention. A current image is then selected from the set of images that have not yet been processed by the process according to the present invention, such that the content of the current image overlaps with the content of the reference image. Initially, the set of images that have already been processed includes solely the initial reference image. Therefore, the set of images not yet processed, includes all the images produced by the video camera but the initial reference image. In one embodiment where the set of images are recorded sequentially, the reference image is the previous image that has been processed, while the current image is the next image in a sequence of recorded images.

A relative offset of the current image is then determined at step 314. In one embodiment according to the present invention, the relative offset of the current image indicates a difference between the angles of rotation at which the reference image and the current image of the set of images were generated (photographed). In another embodiment, the relative offset of the current image may also represent the displacement of the camera between different positions at which images are recorded, such as in the case where a composite image is obtained by translating the camera in a plane parallel with a subject. Offsets are typically measured in "image units", which are defined as the smallest resolution of an image. In one embodiment according to the present invention, the "image units" are pixels. The relative offset is thus a pixel offset from the reference image to the current image.

The relative offset of the current image may be determined by a first correlation process. Note that several existing processes of estimating relative offsets are known by one skilled in the art and thus the first correlation process can be any one of such existing correlation methods. Correlation processes for images are explained in detail in "Digital Image Processing", (1991) second edition, by William K. Pratt. The following is a pseudo-code describing one embodiment of the correlation process:

For relative offset=minimum_offset to maximum
  For all pixels, addressed x and y in an image,
    result=sum(previous_image[x,y] *
    current_image[x+offset,y]).
End For
Best fit=offset that produced the maximum result.

In a purely illustrative way, the first correlation process performs operations that are equivalent to sliding the two images back and forth until it is found that the subject of one image is substantially lined up with the subject of the other image. The first correlation process estimates a relative offset D which indicates the difference between the angles of rotation at which the two images were generated. In other words, in this embodiment, the relative offset D measures, in pixels, how much the video camera moved from the shooting of the reference image to the shooting of the current image. The relative offset can also be determined automatically by using a hardware device which records the angle of rotation every time the video camera takes a picture.

Once the relative offset D of the current image is determined, an absolute pixel offset of the current image (hereinafter "offset") is estimated at step 316 by relating the current image's relative offset D to the reference image's reference offset. In the embodiment of the process according to the present invention explained in conjunction with FIG. 3, the relative pixel offset D of the current image is added to the reference offset, which had been previously estimated in a manner similar to the estimation of the offset of the current image herein explained. A center strip of the current image, having a second width, is stitched onto a resulting composite image stored in digital form onto a storage medium. The center strip of the current image is stitched onto the resulting composite image at a position corresponding to the absolute offset of the current image.

The process then passes to decision block 318 where it is determined whether all the images of the set of images generated by the video camera have been processed. If there are remaining images that have not been processed, the process flows to block 312 from where steps 312, 314 and 316 are performed. However, if all the images from the set of images generated by the video camera have been processed, the process flows to decision block 320. At this block, it is determined whether a 360° composite image is desired, as opposed to an image lesser or greater than 360°. If such is the case, a reference image is created (step 322) by copying a number of pixels from one side of the composite image. A pixel offset of 360° rotation is estimated by using a second correlation process which finds a location in the resulting composite image, where the number of pixels reappear. The resulting composite image is then reduced in width by eliminating all pixels beyond the pixel offset corresponding to 360° rotation. The process then ends at block 324 in this particular embodiment. The second correlation process may be one of the standard correlation processes mentioned in the foregoing.

The computer system of FIG. 2 can be used in conjunction with the process according to the present invention in the following way. A program, such as one for producing a composite image from a plurality of images is stored in a storage device such as mass storage device 212 or memory 216 illustrated in FIG. 2. An execution unit, such as the CPU 214, which is coupled to the storage device, executes the program for producing a composite image thereby generating first, second, and third resulting images. The first resulting image is generated by selecting a current image, having a first measure. The current image has an absolute offset (hereinafter "offset") associated thereto. The second resulting image is generated by extracting from the current image a portion, such as a narrow strip in this embodiment, that has a second measure smaller than the first measure. The third resulting image is generated by transferring the portion of the current image onto the memory at a position corresponding to the offset.

Figure 4:
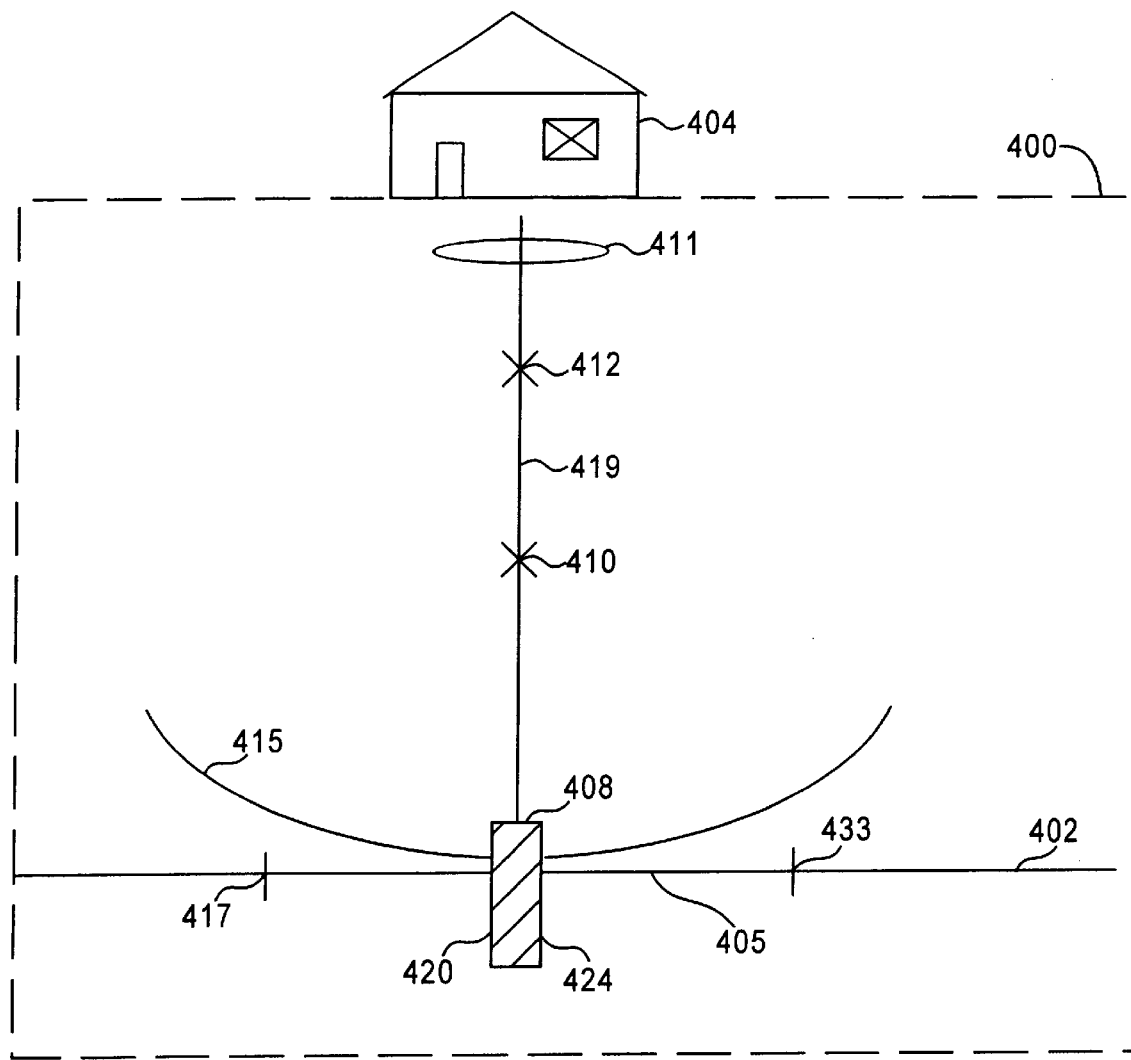
FIG. 4 diagrammatically illustrates a cross-section of a video camera, that may be employed in an embodiment of a process in accordance with the present invention.

FIG. 4 diagrammatically illustrates a cross-section of a video camera 400 and a subject scene 404 to be recorded in one embodiment of the process for producing a composite image according to the present invention. Video camera 400 includes therein an image detection medium such as a charged coupled device 402. A narrow strip 408 (central strip in this embodiment) of a current frame 405 used at step 316 is illustrated at a center of the frame 405, but the invention is not limited in this respect. Strip 408 of frame 405, a focal point 412 of lens 411, and a center of rotation 410 of a tripod, onto which the video camera is mounted, are all substantially aligned along the same line 419.

Arc 415 diagrammatically represents a cylinder onto which an ideal cylindrical composite image of the subject to be recorded 404 may be projected. However, the image of subject 404 is actually sensed and detected by a CCD which is substantially flat. Since in conventional cameras CCD 402 is not curvilinear, sensing and detecting the image onto CCD 402 may result in cylindrical distortions in the absence of an embodiment of the process according to the present invention.

An embodiment of a process according to the present invention selects strip 408 at the center of each frame 405, bounded by demarcation lines 417 and 433, and stitches it, instead of the entire frame, onto a composite image (not shown) representing the desired scene. The stitching of strip 408 reduces the error between an image projected onto imaginary arc 415, and the image recorded onto CCD 402. The portion of arc 415, delineated by two vertical sides 420 and 424 of strip 408, has substantially the same shape (flat) as the portion of the CCD 402 delineated by the two sides 420 and 424. The narrower strip 408 is, the smaller is the error between the ideal image projected onto arc 415 and an actual image produced onto frame 405, as strip 408 more closely approximates the shape of the portion of arc 415 delineated by sides 420 and 424. Since a narrow strip of a frame is used in the process of stitching images, the difference between the focal point of the lens and the center of rotation minorly affects the smoothness of the composite image and can be essentially ignored, thereby removing the need to rotate the camera about the focal point of the lens.

Figures 5A, 5B, 5C:
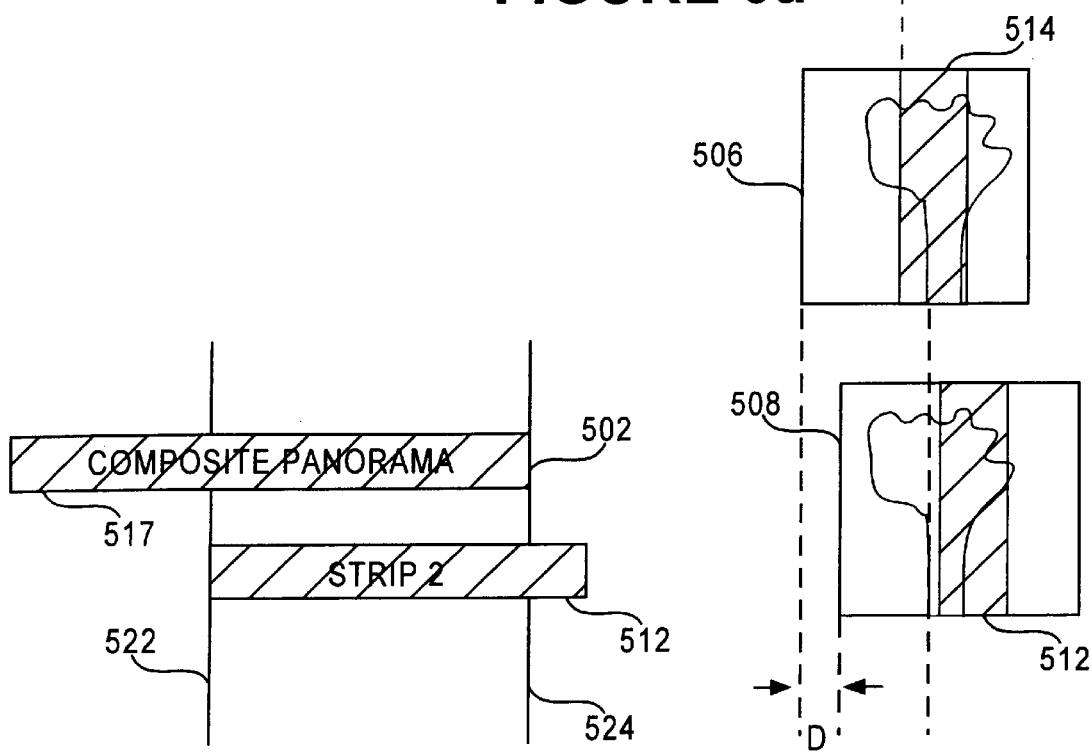
FIG. 5a diagrammatically illustrates a composite image that may be produced by one embodiment of a process for producing a composite image according to the present invention.
FIG. 5b diagrammatically illustrates two images shifted therebetween with a relative offset which may be processed by an embodiment of a process for producing a composite image in accordance with the present invention.
FIG. 5c diagrammatically illustrates a strip of one image being stitched into a composite image at an absolute offset thereof.

FIG. 5a illustrates composite image 502 formed by the process according to the present invention. The images used by the process according to the present invention include all features of the composite image 502, except that some images are overlapping (not shown) such that direct stitching of one image to another would cause the overall image to be distorted.

FIG. 5b illustrates two images 506 and 508 having strips 514 and 512 respectively, shifted with a relative offset therebetween. Image 506 (reference image) can be the previous image that has already been stitched onto a digital storage medium. Image 508 (current image) is one of the remaining images that has not been stitched onto the composite resulting image. In this example, the video camera was rotated to the right, producing positive offsets from the left of the composite image.

Once the relative offset D is estimated by the first correlation process, an absolute offset of strip 512 is estimated by adding the relative offset D to the reference offset of strip 514. Then, strip 512 can be stitched together with the composite image 502 by having strip 512 overlaying a portion of the composite image. The stitching of strip 512, in one embodiment of the process according to the present invention, includes transferring and copying strip 512 onto the storage medium storing composite image 502.

FIG. 5C illustrates the strip 512 and the composite image 502. Strip 512 and the composite image 502 are stitched such that a resulting composite image includes the leftmost part of the composite image (left of demarcation line 522) and all of strip 512. Alternatively, a weighted average process can be used to stitch the overlapping portion of the composite image 502 and strip 512. According to the weighted average process, composite image 502 and strip 512 are gradually blended together between lines 522 and 524. Strip 512 is stitched to composite image 502 at the right part of demarcation line 522, such that at demarcation line 522, only 0% of strip 512 is stitched to the composite image, while the content of composite image 502 at line 522 is 100% stitched. The portion of strip 512, between lines 522 and 524, is stitched with increased weight such that at demarcation line 524, 100% of strip 512 and 0% of composite image 502 is stitched to the resulting composite image. Accordingly, the resulting composite image seen on a medium that stores composite image 502, in one embodiment, is an image starting with the central strip of the initial reference image 506 and ending with a portion of the central strip of the current image 508 shot by the video camera.

During the first correlation process, only a limited part of an image, area of correlation (not shown), is subject to correlation. For example, for an image having a width of 320 pixels, the area of correlation has a width of 80 pixels, while the width of the strip is approximately 16 pixels. In choosing a width for the correlation area and for the strip, it is desirable to consider several factors. For example, the correlation area should be fairly large. The smaller the correlation area is, the more likely the correlation process may have difficulty distinguishing similar images. If a scene includes several repeating figures and the correlation area is small, the process is more likely to miscorrelate. Accordingly, the larger the correlation area, the less likely there is to be a miscorrelation in an image involving repeating elements. However, if the correlation area is too large, the more likely it is that this area may include wide angle distortions caused by the lens and thus the process may fail to correlate successive images. As to the strip, the thinner the strip stitched onto the composite image is, the less distortions occur in the composite image. However, the narrower the strip is, the slower the video camera should be moved. If the video camera is moved too fast relative to the rate at which images are recorded, a black strip may result between two consecutive images on the composite image. It is desirable, however, that the strip not be too large as the resulting image will contain seams caused by wide angle distortion between images.

Figure 6:
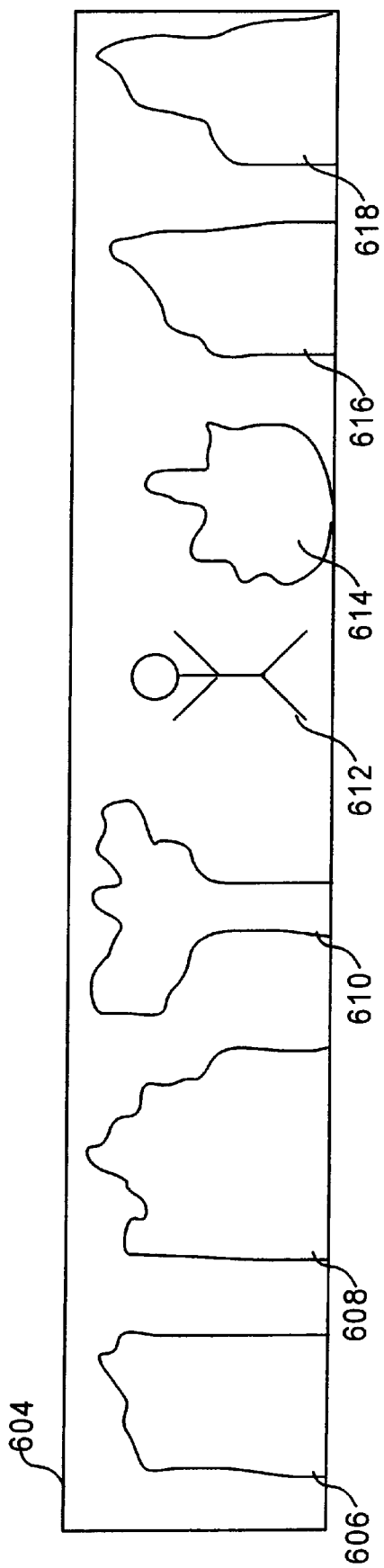
FIG. 6 diagrammatically illustrates an image processed by one embodiment of a process for producing a composite image according to the present invention.

FIG. 6 diagrammatically illustrates a composite image stitched onto storage medium 604, with a first discrete scene element 606 appearing at the left portion of storage medium 604 and the same discrete scene element 616 appearing at the right portion of storage medium 604. A second correlation process is performed to determine where the 360° composite image ends, since the set of images is typically produced by rotating the camera a little over 360°. In one embodiment of the process according to the present invention, this may be accomplished by taking a relatively wide part (first part) of the composite image, which includes scene element 606, (the leftmost side of storage medium 604), and performing a correlation process with a part (second part) of the composite image recorded at the right of recording medium 604 to find where image 606 reappears at the end of recording medium 604. In the example illustrated in FIG. 6, scene element 606 is duplicated by scene element 616 at the right portion of storage medium 604. If such is the case, a reference image is created by copying a number of pixels from one side where the composite image starts. A pixel offset of 360° rotation is estimated by using the second correlation process which finds a location in the resulting composite image, where the number of pixels reappear. The resulting composite image is then reduced in width by eliminating all pixels beyond the pixel offset corresponding to 360° rotation.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for producing a composite image comprising:
 a. selecting a current image from a plurality of sequentially captured images, said current image having an offset;

b. extracting a central portion from said current image, said central portion having a first dimension substantially smaller than a first dimension of said current image and a second dimension substantially the same as a second dimension of said current image; and c. transferring said central portion of said current image onto a storage medium, that stores said composite image to a position corresponding to said offset.

2. The method of claim 1 wherein the offset of the current image is estimated by relating a reference offset, associated with a first reference image, to a relative offset between said current image and said first reference image.

3. The method of claim 2 wherein the relative offset is estimated by performing a correlation process between the current image and the first reference image.

4. The method of claim 3 wherein the reference offset is estimated by performing a correlation process between the first reference image and a second reference image.

5. The method of claim 4 wherein the first reference image is selected from the plurality of sequentially captured images.

6. The method of claim 5 wherein the first reference image overlaps with the current image in said first dimension.

7. The method of claim 1 wherein transferring said central portion of said current image includes stitching said central portion to an image transferred to the storage medium.

8. The method of claim 1 wherein the plurality of sequentially captured images is produced by a video camera while being rotated about a center of rotation a fixed distance from the subject of the image.

9. The method of claim 8 wherein the offset of the current image corresponds to the video camera's angle of rotation when said current image is produced by the video camera.

10. A computer system comprising:

a storage device having stored therein a program for producing a composite image from a plurality of sequentially captured images; and an execution unit, coupled to said storage device, for executing said program to generate first, second, and third resulting images, where:

a. said first resulting image is generated by selecting a current image from said plurality of sequentially captured images, said current image having an offset;

b. said second resulting image is generated by extracting a central portion from said current image, said central portion having a first dimension substantially smaller than a first dimension of said current image and a second dimension substantially the same as a second dimension of said current image; and c. said third resulting image is generated by transferring said central portion of said current image onto a storage medium, that stores said composite image, to a position corresponding to said offset.

11. The computer system of claim 10 wherein the offset of the current image is estimated by relating a reference offset, associated with a first reference image, to a relative offset between said current image and said first reference image.

12. The computer system of claim 11 wherein the relative offset is estimated by performing a correlation process between the current image and the first reference image.

13. The computer system of claim 12 wherein the reference offset is estimated by performing a correlation process between the first reference image and a second reference image.

14. The computer system of claim 13 wherein the first reference image is selected from the plurality of sequentially captured images.

15. The computer system of claim 14 wherein the first reference image overlaps with the current image in said first dimension.

16. The computer system of claim 10 wherein transferring said central portion of said current image includes stitching said central portion to an image transferred to the storage medium.

17. The computer system of claim 10 wherein the plurality of sequentially captured images is produced by a video camera while being rotated about a center of rotation a fixed distance from the subject of the image.

18. The computer system of claim 17 wherein the offset of the current image corresponds to the video camera's angle of rotation when said current image is produced by the video camera.

19. A storage device that has stored therein a program for producing a composite image from a plurality of sequentially captured images, the program, when executed by an execution unit, resulting in the execution unit generating first, second, and third resulting images, where:

a. said first resulting image is generated by selecting a current image from said plurality of sequentially captured images, said current image having an offset;

b. said second resulting image is generated by extracting a central portion from said current image, said central portion having a first dimension substantially smaller than a first dimension of said current image and a second dimension substantially the same as a second dimension of said current image; and c. said third resulting image is generated by transferring said central portion of said current image onto a storage medium, that stores said composite image, to a position corresponding to said offset.

20. The storage device of claim 19, wherein the offset of the current image is estimated by relating a reference offset, associated with a first reference image, to a relative offset between said current image and said first reference image.

21. The storage device of claim 20, wherein the reference offset is estimated by performing a correlation process between the first reference image and a second reference image.

22. A method for producing a composite image comprising:

a. capturing a plurality of images while rotating a video camera about a fixed center of rotation;

b. selecting a current image from the plurality of images, said current image having an offset;

c. identifying a central rectangular portion of said current image, said central rectangular portion having a first dimension smaller than a first dimension of said current image and a second dimension substantially the same as a second dimension of said current image; and d. transferring said central rectangular portion of said current image onto a storage medium, that stores said composite image, to a position corresponding to said offset.

23. The method of claim 22 wherein the offset of the current image is estimated by relating a reference offset, associated with a first reference image, to a relative offset between said current image and said first reference image.

24. The method of claim 23 wherein the relative offset is estimated by performing a correlation process between the current image and the first reference image.

25. The method of claim 24 wherein the reference offset is estimated by performing a correlation process between the first reference image and a second reference image.

26. The method of claim 25 wherein the first reference image is selected from the plurality of images.

27. The method of claim 26 wherein the first reference image overlaps with the current image in said first dimension.

28. The method of claim 22 wherein transferring said rectangular portion of said current image includes stitching said rectangular portion to an image transferred to the storage medium.

29. The method of claim 22 wherein the offset of the current image corresponds to an angle of rotation of the video camera when said current image is captured by the video camera.

* * * * *